(12) United States Patent
Chan

(10) Patent No.: US 6,834,164 B1
(45) Date of Patent: Dec. 21, 2004

(54) ALIGNMENT OF AN OPTICAL TRANSCEIVER FOR A FREE-SPACE OPTICAL COMMUNICATION SYSTEM

(75) Inventor: Victor J. Chan, San Diego, CA (US)

(73) Assignee: Douglas Wilson Companies, San Diego, CA (US)

( * ) Notice: Subject to any disclaimer, the term of this patent is extended or adjusted under 35 U.S.C. 154(b) by 480 days.

(21) Appl. No.: 09/876,168

(22) Filed: Jun. 6, 2001

Related U.S. Application Data

(60) Provisional application No. 60/210,152, filed on Jun. 7, 2000.

(51) Int. Cl.[7] .............................................. H04B 10/00
(52) U.S. Cl. ........................ 398/129; 398/130; 398/131
(58) Field of Search ................................ 398/122, 128, 398/129, 130, 131, 135

(56) References Cited

U.S. PATENT DOCUMENTS

| | | |
|---|---|---|
| 3,566,126 A | 2/1971 | Lang et al. ................. 398/129 |
| 4,882,774 A | 11/1989 | Grotzinger |
| 5,060,304 A | 10/1991 | Solinsky |
| 5,229,593 A | 7/1993 | Cato |
| 5,264,955 A | 11/1993 | Sakanaka et al. |
| 5,451,765 A | 9/1995 | Gerber |
| 5,475,520 A | 12/1995 | Wissinger |
| 5,532,858 A | 7/1996 | Hirohashi et al. |
| 5,546,445 A | 8/1996 | Dennison et al. |
| 5,592,320 A | 1/1997 | Wissinger |
| 5,710,652 A | 1/1998 | Bloom et al. |
| 5,822,099 A | 10/1998 | Takamatsu |
| 5,837,996 A | 11/1998 | Keydar |
| 6,049,593 A | 4/2000 | Acampora |
| 6,195,044 B1 | 2/2001 | Fowell |
| 6,507,424 B2 * | 1/2003 | Sakanaka ..................... 398/129 |
| 6,590,685 B1 * | 7/2003 | Mendenhall et al. ....... 398/121 |

FOREIGN PATENT DOCUMENTS

| | | |
|---|---|---|
| EP | 0 756 431 A2 | 1/1997 |
| WO | WO 97/49204 | 12/1997 |
| WO | WO 98/20631 | 5/1998 |

* cited by examiner

*Primary Examiner*—Leslie Pascal
*Assistant Examiner*—Dzung Tran
(74) *Attorney, Agent, or Firm*—Knobbe, Martens, Olson & Bear, LLP

(57) ABSTRACT

Systems and techniques for aligning relative orientation of an optical transmitter and an optical receiver that are mounted to a common fixture in an optical transceiver.

12 Claims, 4 Drawing Sheets

ALIGNMENT OF AN OPTICAL TRANSCEIVER FOR A FREE-SPACE OPTICAL COMMUNICATION SYSTEM

This application claims the benefit of U.S. Provisional Application No. 60/210,152, filed on Jun. 7, 2000.

BACKGROUND

This application relates to optical transmitters and receivers, and more specifically, to techniques and systems for aligning an optical transmitter and an optical receiver in an optical transceiver in a free-space optical communication system.

An optical transceiver may be designed to include an optical transmitter with a light source such as a laser to transmit an output optical beam and a photosensor to receive and detect an input optical beam. Such a transceiver can be used to establish a full-duplex or half-duplex optical communication link with another optical transceiver in a free-space optical communication system. In one class of optical transceivers, the optical transmitter and the optical receiver are mounted to a motorized turret and are fixed relative to each other. Hence, both the direction of the optical transmitter and the direction of the optical receiver change in the same manner with the movement of the turret.

In such a system, when the output beam of a first transceiver is received by the receiver of a second transceiver, it is desirable that the output beam from the second transceiver also hits the receiver of the first transceiver in order to establish a two-way communication.

SUMMARY

The present techniques and systems include an alignment system to align the receiver relative to the transmitter of a transceiver so that two of such transceivers can establish an initial communication link by adjusting their respective turrets, without changing the relative alignment of the transmitter and receiver within each transceiver.

BREIF DESCRIPTION OF DRAWINGS

DETAILED DESCRIPTION

Figure 1A:
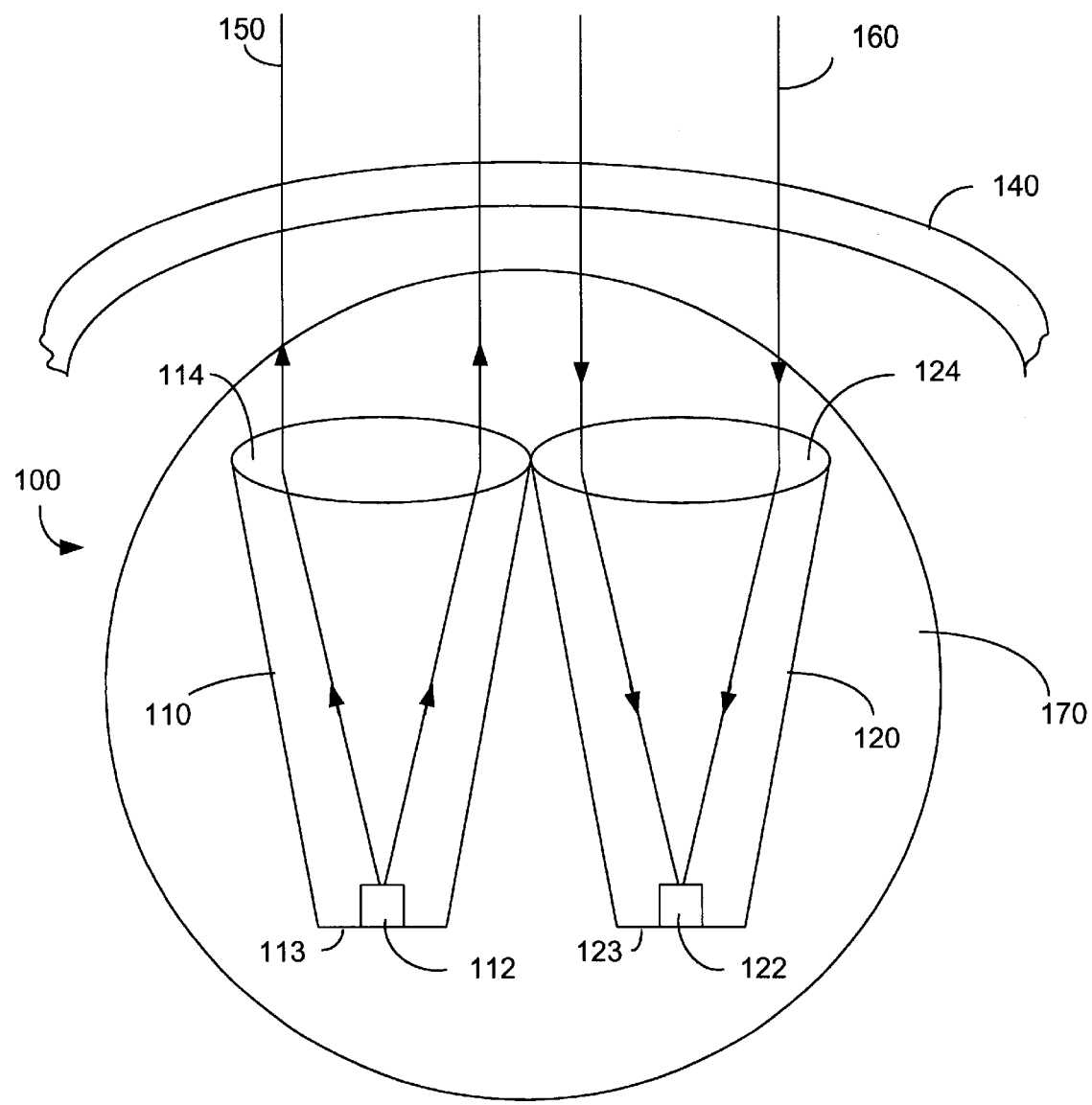
FIG. 1A shows one embodiment of the optical layout of a transceiver having an optical transmitter and an optical receiver.

FIG. 1A shows one embodiment of the optical layout of a transceiver 100 having an optical transmitter 110 and an optical receiver 120. The transmitter 110 has a light source 112 such as a semiconductor laser to produce an output beam 150. The light source 112 is mounted to a back plate 113 of a transmitter housing for the transmitter 110. The back plate 113 may be fixed to the transmitter housing, or may be made adjustable to change the direction of the output beam 150. The transmitter 110 may also include an output optical unit 114 to substantially collimate the output beam 150. The output optical unit 114 in general may include a lens or a combination lens formed of two or more lenses.

The receiver 120 may include a receiver housing that holds a receiving optical unit 124 and a photodetector 122. The receiving optical unit 124 may include, e.g., a lens or a combination lens, and is configured to receive a beam 160 from another transceiver that is positioned to receive the output beam 150. The photodetector 122 is approximately positioned on the optical axis of the receiving optical unit 124 to detect the received beam 160. An adjustable back plate 123 in the receiver housing is used to hold and support the photodetector 122 and is designed to be adjustable in its position and orientation.

Both transmitter 110 and receiver 120 can be engaged to a common motorized turret 170 that is operable to change its position and orientation by a motorized mechanism. When the position and orientation of the turret 170 are adjusted via an electronic control, the positions and orientations of both the transmitter 110 and the receiver 120 mounted on the turret 170 are adjusted at the same time by about the same amount. Hence, the position and orientation of the transceiver 100 can be electronically controlled in response to a control command generated from either a on-board control electronics or an external control unit such as a remote control computer. The transceiver 100 may be placed in a transceiver housing with a window 140 formed of a transparent material so that the output beam 150 and the input beam 160 pass through the window 140. The window 140 may be curved to have, e.g., a cylindrical shape.

Figure 1B:
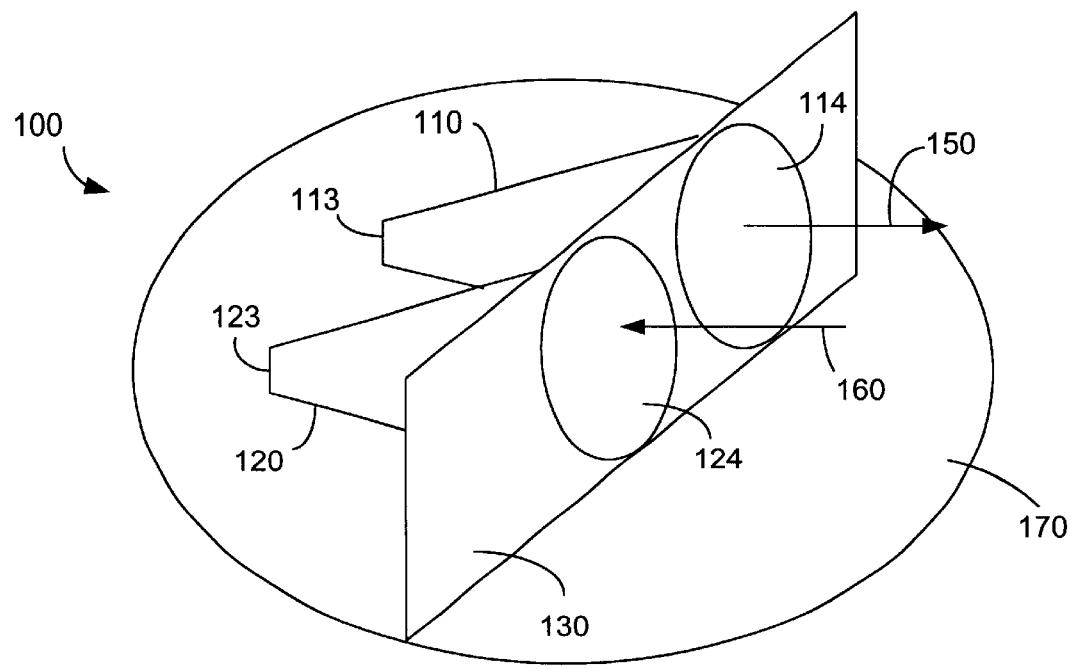
FIG. 1B shows an exemplary transceiver where the optical transmitter and receiver are fixed to a fixture.

FIG. 1B shows one embodiment of the transceiver 100 where the transmitter 110 and the receiver 120 are fixed to a fixture element 130. The fixture element 130 may include a rigid board to which the transmitter housing for the transmitter 110 and receiver housing for the receiver 120 are engaged. This assembly 100 as a whole is then mounted to the motorized turret 170. Two or more such turret-mounted transceivers may be included in a single transceiver station and directed to individually communicate with two or more other transceiver stations in an optical network of transceiver stations, sometimes at the same time. Alternatively, two transceiver stations each with at least two transceivers may communicate with each other through two two-way communication links if desirable.

In an ideal relative alignment between the transmitter 110 and the receiver 120 of the transceiver 100, output beams 150 and 160 respectively produced by two communicating transceivers are substantially parallel to each other and the beams 150 and 160 are respectively focused on or near the centers of the photodetectors in their respective receivers. In the actual alignment process, the relative alignment of the transmitter 110 and the receiver 120 should be adjusted in the presence of the window 140 of the transceiver housing so that the beams 150 and 160 are parallel outside the transceiver housing.

Such alignment may be performed by separating two transceivers by a distance similar to or greater than their ordinary operating range, e.g., up to about several hundred yards. The output beam of the first transceiver is directed toward the receiving optical unit of the second transceiver. The output beam of the second transceiver is directed back toward the receiving optical unit of the first transceiver. The back plate 123 of the first transceiver is adjusted so that the beam 160 is focused to the center of the photodetector 122. The back plate 123 is then secured in that position. Such a far-field alignment requires long optical path between the two transceivers and can be inconvenient in some manufacturing facilities. One aspect of the present disclosure is to provide a relatively compact alignment system to efficiently perform such alignment on a work bench or an optical table and to simulate the far-field alignment.

Figure 2:
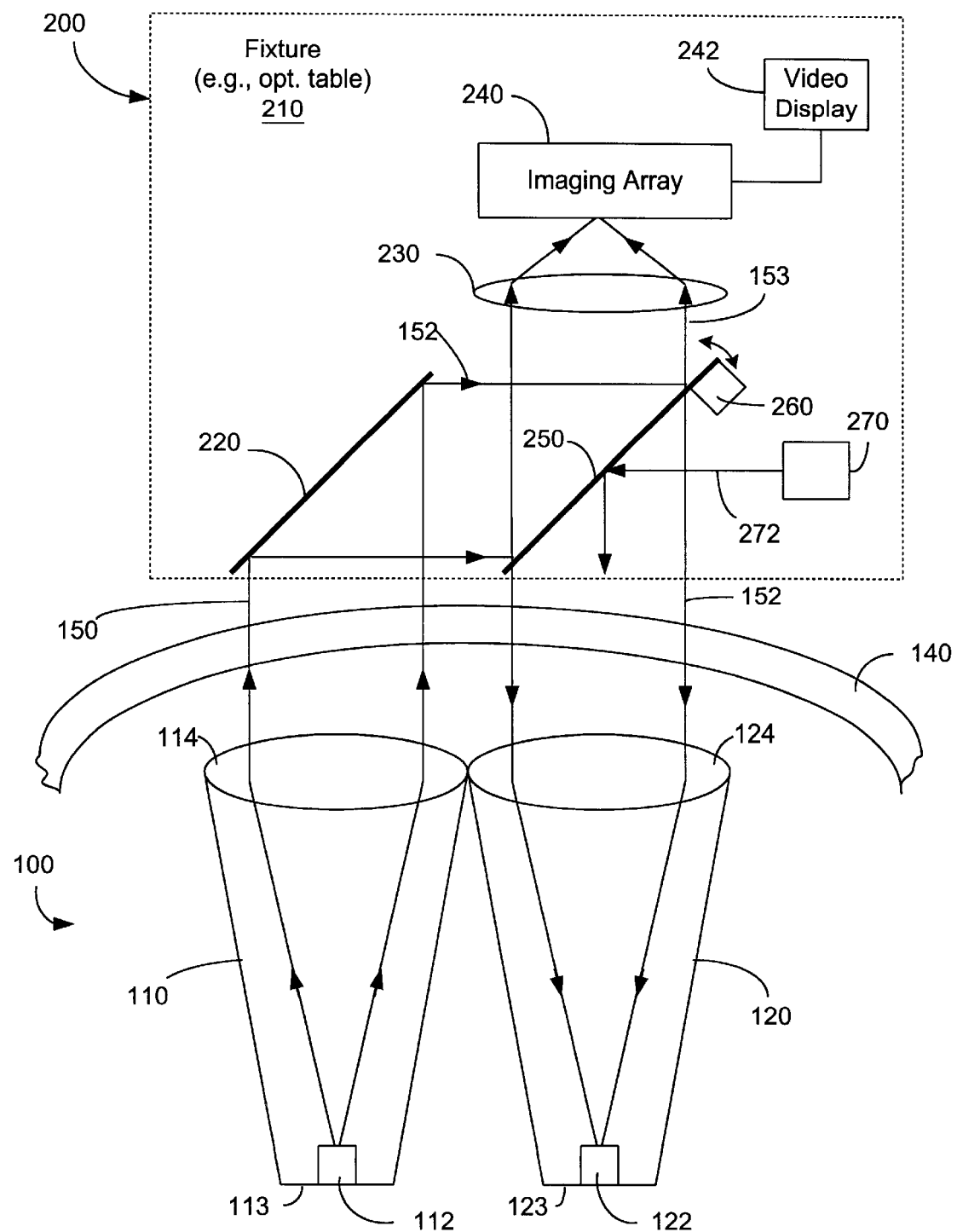
FIG. 2 shows an alignment device according to one embodiment.

FIG. 2 shows one embodiment-of the alignment system 200. A fixture 210, such as a small optical table, is used as a platform to mount various optical elements for the alignment system 200. An optical transceiver 100 under alignment can be mounted to the fixture 210 to direct its output beam 150 to the alignment system 200.

In this embodiment, a reflector 220 is mounted on the fixture 210 to receive the output beam 150 from the transmitter 110 in the transceiver 100 under alignment. The reflector 220 reflects the beam 150 as a second beam 152 towards a beam splitter 250 mounted on the same fixture 210. The beam splitter 250 receives the beam 152 with a first surface and reflects a portion of the beam 152 as a third beam 153. An optical imaging element 230 (e.g., a lens) and an imaging array 240 (e.g., a CCD camera) are mounted on the fixture 210 in the optical path of the third beam 153 so that the third beam 153 is focused by the imaging element 230 onto the imaging array 240. This provides an image of the light source 112 in the transmitter 110 of the transceiver 100 on the imaging array 240.

The alignment system 200 also uses a light source 270 mounted to the fixture 210 to produce an illumination beam 272 to a second surface of the beam splitter 250 opposite to the first surface. The illumination beam 272 is partially reflected by the beam splitter 250 towards the receiver 120 of the transceiver 100 to illuminate the photodetector 122. Alternatively, the illumination beam 272 may be directly projected to the optical receiver 120 to illuminate the photodetector 122 without being reflected by the beam splitter 250. In either case, the scattered light of the illumination beam 272 from the surface of the photodetector 122 propagates to and partially transmits through the beam splitter 250. The transmitted scattered light is imaged by the imaging element 230 to form an image of the photodetector 122 on the imaging array 240. As illustrated, a video display 242 such as a computer or TV monitor may be used to show the images on the imaging array 240.

Therefore, the alignment system 200 is designed to produce two images on the imaging array 240: the image of the light source 112 of the transmitter 110 by using the output beam 150 and the image of the photodetector 122 of the receiver 120 by using an auxiliary illumination beam 272. When the positions of the reflector 220, the beam splitter 250, the imaging element 230, the imaging array 240, and the illumination light source 270 are properly fixed relative to one another on the fixture 210, the relative position of the two images formed on the imaging array 240 can be used to represent the relative orientation of the transmitter 110 and the receiver 120. For example, the system 200 may be designed to overlap the two images in a selected target area on the video display 242 when the transmitter 110 and the receiver 120 are properly aligned. Hence, the relative position of the two images on the video display 242 can be used to determine and align the relative orientation of the transmitter 110 and the receiver 120.

The alignment system 200 may be calibrated by using a pre-aligned transceiver. With the pre-aligned transceiver positioned at the location where unaligned transceivers are located when undergoing alignment, the orientation of one or both of the reflector 220 and the beam splitter 250 are adjusted to place the image of the light source 112 of the transmitter 110 by using the output beam 150 and the image of the photodetector 122 of the receiver 120 by using an auxiliary illumination beam 272 in the selected target area on the imaging array 240. Each of the reflector 220 and the beam splitter 250 is coupled to an adjustment mechanism that is operable to change the orientation. Such an adjustment mechanism may be implemented by a manual or automated positioner that changes the orientation of the reflector 220 or the beam splitter 250. In the example shown in FIG. 2, an adjustment mechanism 260 for the beam splitter 250 is illustrated.

The calibration of the system 200 may be done as follows. First, the pre aligned transceiver is positioned at the designed location on the fixture 210 for placing a transceiver under alignment. The orientation of pre-aligned transceiver then adjusted so that the image of its detector 122 is within the target area on the imaging array 240. Note that the image of the detector 122 is formed from the back scattered light of the illumination beam 272 and its position is not sensitive to the incident direction of the illumination beam 272. Hence, the image location of the detector 122 is primarily determined by the orientation of the receiver 120. Next, the adjustment mechanism 260 is adjusted to change the orientation of the beam splitter 250 to focus the beam 153 from the aligned transmitter 110 within the same target area on the imaging array 240. This completes the calibration of the alignment system 200.

Once the alignment system 200 is calibrated, it can be used to align or check the alignment of other transceivers. First, a transceiver under test is positioned at the designated location on the fixture 210 and is oriented so that its output beam 150 from the transmitter 110 is focused within the target area on the imaging array 240. Then, without adjusting optical elements in the calibrated system 200, the position of the detector 122 is adjusted by adjusting the back plate 123 so that the image of the detector 122 is located within the target area on the imaging array 240. This completes the alignment of the transceiver.

Figure 3:
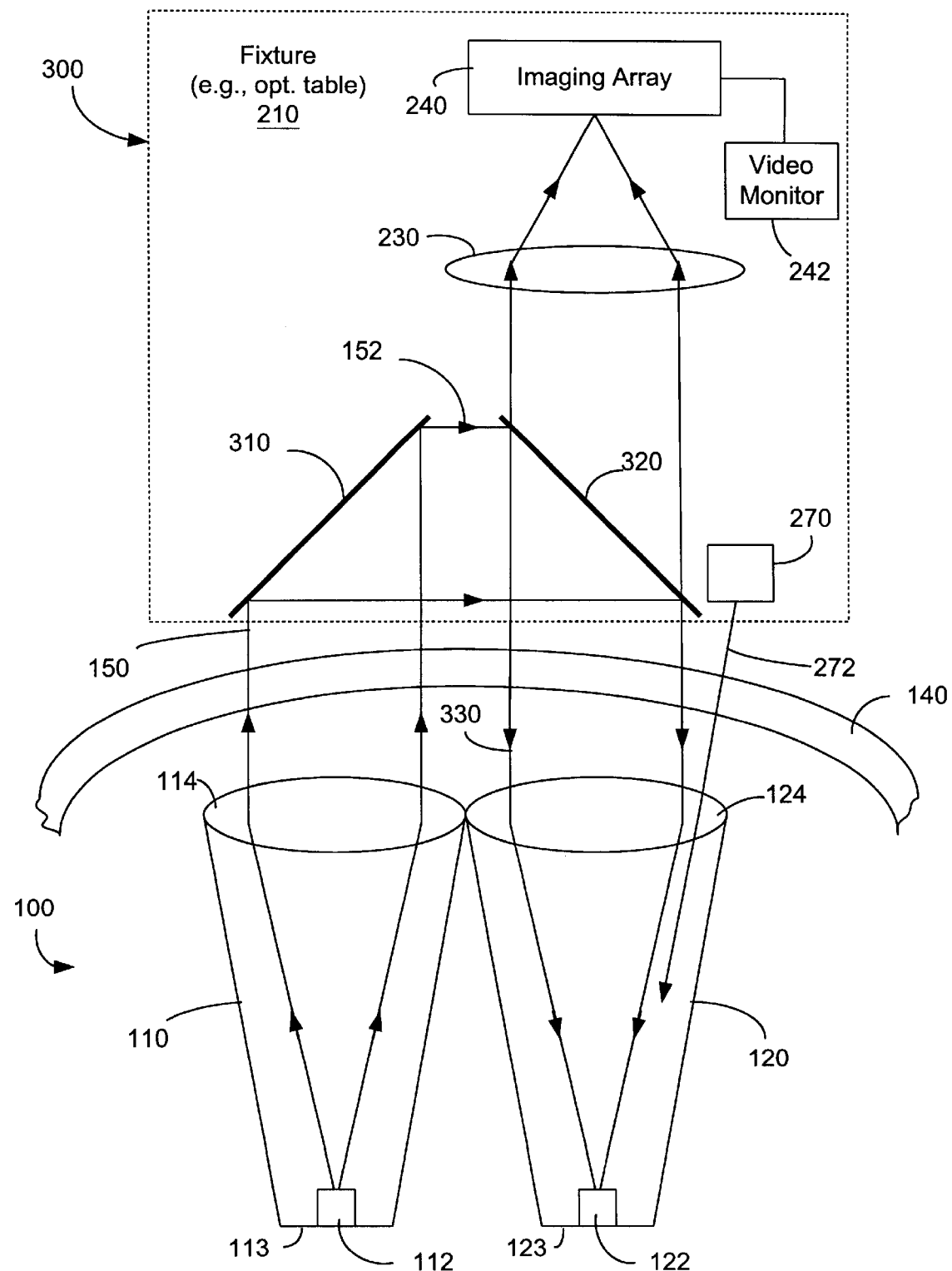
FIG. 3 shows another implementation of the alignment device.

FIG. 3 shows another embodiment of the alignment system 300, where the output beam 150 from the transmitter 110 is directed to and focused onto the detector 122 in the receiver 120. A roof prism 310 and a beam splitter 320 are used in the system 300 in lieu of the reflector 220 and the beam splitter 250 in the system 200, respectively, to reflect the beam 152 as a beam 330 to form an image on the detector 122 in the receiver 120. The illumination light source 270 may be positioned to directly project the illumination beam 272 into the receiver 120 by passing through the receiving optical unit 124. The detector 122 is then illuminated by the illumination beam 272. The scattered light from the detector 122 thus includes both the image formed by the beam 330 and the image of the detector 122 illuminated by the illumination beam 272.

Similar to the calibration of the system 200 in FIG. 2, a pre-aligned transceiver may be used to calibrate the system 300. For example, the orientations of the imaging array 240, the roof prism reflector 310, and the beam splitter 320 may be selected during calibration to allow the image of the beam 330 and the image of the detector 122 to overlap within a selected location in the detector 122 and to fall within a selected target area on the imaging array 240 when the transmitter 110 and the receiver 120 are aligned with each other.

In operation, a transceiver under alignment is placed in the designed position on fixture 210 and is oriented so that its output beam 330 from the transmitter 110 is focused onto or near the detector 122. The detector 122 scatters the focused beam 330 to produce scattered light. A portion of the scattered light transmits through the beam splitter 320 and is imaged onto the imaging array 240 by the imaging element 230. Then, without adjusting any optical element in the calibrated system 300, the position of the detector 122 is adjusted by adjusting the back plate 123 so that the image of the detector 122 overlaps the image of the focused transmitter beam 330 on the selected target area of the imaging array 240.

The roof prism 310 in the system 300 has reflective properties that emulate a translating retro-reflector. Retro-reflective properties are desirable in the alignment system 300 because the transmitter beam 150 is directed towards detector 122 instead of towards the imaging array 240 as in alignment system 200. If the roof prism 310 is not used, the alignment system 300 may be sensitive to variations in the output angle of the transmitter beam 150. Thus, the roof prism 310 helps to alleviate the need for accurately adjusting the orientation of the transceiver under test in order for the image of its transmitter beam 330 on the detector 122 to initially fall within a selected target area on the imaging array 240.

The above calibration of the alignment systems in FIGS. 2 and 3 and their use for aligning a transceiver may be automated. An electro-mechanical servo can be used to achieve such automation. A frame grabber may be coupled to the imaging array 240 to digitize the imaging information on the imaging array 240. A signal processor, such as microprocessor or a computer, is used to process the digitized imaging information to determine an error of alignment in either the beam splitter 250 during calibration or the detector 122 during alignment of the transceiver 100. This error is then used by the servo to reduce the error automatically adjusting the adjustment mechanism 260 during calibration of the system, or the back plate 123 of the receiver 123 during alignment when the system is calibrated. This process repeats automatically until the error of alignment detected by the imaging array 240 is at or below an acceptable level.

A number of embodiments of the invention have been described. Nevertheless, it will be understood that various modifications and enhancements may be made without departing from the following claims.

What is claimed is:

1. A system, comprising:
 a fixture having a designated location where an optical transceiver, with an optical transmitter and an optical receiver, is to be placed;
 a reflector on said fixture to receive an output beam from the optical transmitter of the optical transceiver, said reflector operable to reflect the output beam as a second beam;
 an illumination light source on said fixture, positioned to project an illumination beam to the optical receiver at said designated location;
 a beam splitter on said fixture to reflect the second beam as a third beam and to receive and partially transmit scattered light from the optical receiver produced by scattering of the illumination beam in a direction of the third beam;
 an optical imaging element on said fixture in an optical path of the third beam to receive and image the third beam and the scatter light from the optical receiver;
 an imaging array positioned on said fixture to receive an image of the third beam and an image of the optical receiver; and
 an adjustment mechanism engaged to one of said reflector and said beam splitter and operable to adjust a direction of the third beam.

2. The system as in claim 1, further comprising:
 a frame grabber coupled to said imaging array to produce position information of the image of the third beam and the image of the optical receiver; and
 a signal processor coupled to receive the position information from said frame grabber and operable to determine a position error between the image of the third beam and the image of the optical receiver on said imaging array,
 wherein said signal processor controls said adjustment mechanism to automatically adjust one of said reflector and said beam splitter to reduce the position error during calibration.

3. The system as in claim 1, wherein said imaging array is located on said fixture near a focal plane of said optical imaging element.

4. The system as in claim 1, further comprising a video display coupled to said imaging array to produce a video display of said images of the third beam and the scattered light from the optical receiver.

5. A method for aligning an optical transceiver that has an optical transmitter and an optical receiver, comprising:
 positioning the optical transceiver at a designated location on a fixture;
 directing an output beam from the optical transmitter of the optical transceiver to a reflector and then to a beam splitter on the fixture, wherein the beam splitter reflects a portion of the output beam to an imaging array on the fixture to form an image of the optical receiver;
 adjusting the orientation of the optical transceiver to position the image of the optical transmitter within a target area of the imaging array;
 projecting an illumination beam to the optical receiver to produce scattered light so that a portion of the scattered light from the optical receiver transmits through the beam splitter to form an image of the optical receiver on the imaging array;
 detecting a position difference between the image of the optical transmitter and the image of the optical receiver on the imaging array; and
 adjusting the optical receiver to reduce the position difference without adjusting the optical transmitter.

6. The method as in claim 5, further comprising performing a calibration process prior to aligning the optical transceiver, wherein the calibration process includes:
 positioning another pre-aligned optical transceiver at the designated location on the fixture in which an optical transceiver and an optical transmitter are aligned relative to each other;
 adjusting the orientation of the pre-aligned optical transceiver to position the image of the optical receiver within a target area of the imaging array, wherein the image of the optical receiver is formed from scattered light from the optical receiver under illumination by the illumination beam; and
 adjusting an orientation of at least one of the reflector and the beam splitter to place an image of the optical transmitter over the image of the optical receiver on the imaging array.

7. The method as in claim 6, further comprising using an electrical-mechanical servo control mechanism to automate the calibration process.

8. A system, comprising:
 a fixture;
 a reflector positioned on said fixture to receive an output beam from an optical transmitter of an optical transceiver, reflecting said output beam as a second beam;
 a beam splitter positioned on said fixture to reflect a portion of said second beam towards the optical transceiver as a third beam to reach an optical receiver therein;

an imaging array positioned on said fixture to receive an image of the optical receiver through said beam splitter to determine a position of said third beam on the optical receiver; and a light source to illuminate said optical receiver to form the image of the optical receiver on said imaging array.

9. The system as in claim 8, further comprising an alignment mechanism coupled to at least one of said reflector and said beam splitter to change a direction of said third beam towards the optical receiver.

10. The system as in claim 9, further comprising an electrical-mechanical servo to automatically adjust said alignment mechanism for calibration according to imaging information on said imaging array.

11. The system as in claim 10, wherein said servo includes a frame grabber coupled to receive image signals from said imaging array and to digitize said imaging signals, and a processor that processes said digitized imaging signals to determine a position error and produce a control signal to control said alignment mechanism to reduce said position error.

12. The system as in claim 8, wherein said reflector includes a roof prism.

* * * * *